United States Patent [19]
Van Handel et al.

[11] 3,813,777
[45] June 4, 1974

[54] INTRA-ORAL METHOD OF MAKING DENTURES

[76] Inventors: Ambrose B. Van Handel, 8653 Louise Ave., Northridge, Calif. 91324; Jerome J. Brent, 15 La Crescenta Dr., Camarillo, Calif. 93100

[22] Filed: Sept. 25, 1972

[21] Appl. No.: 291,860

[52] U.S. Cl. ................................ 32/2
[51] Int. Cl. ............................. A61c 13/00
[58] Field of Search ......................... 32/2, 8

[56] References Cited
UNITED STATES PATENTS

| | | | |
|---|---|---|---|
| 2,596,941 | 5/1952 | Quintella | 32/2 |
| 3,335,495 | 8/1967 | Wichner | 32/2 |
| 3,621,575 | 11/1971 | Schneider et al. | 32/2 |

*Primary Examiner*—Robert Peshock
*Attorney, Agent, or Firm*—Nilsson, Robbins & Berliner

[57] ABSTRACT

Dentures made by curing a base material within a wax moldable tray. The wax tray is softened by body temperature and molded within a patient's mouth by use of tongue, cheek and lips before the base material in a plastic state is inserted. The plastic base material bonds to adjustably positioned synthetic teeth projecting from the tray and is molded directly on the gums of the patient to form the gum bearing surfaces. Thereafter, the wax tray is boiled away leaving a finished denture with a lifelike gum surface that requires little if any finishing.

4 Claims, 9 Drawing Figures

INTRA-ORAL METHOD OF MAKING DENTURES

BACKGROUND AND SUMMARY OF THE INVENTION

This invention relates to the fabrication of artificial dentures and more particularly to the processing of a denture directly within a patient's mouth.

The usual procedure for making dentures involves initially obtaining an impression of the edentulous dental ridge or ridges from which a plaster or stone model is made. Bite rims are built on these models and utilized to record the vertical dimensions and centric position of the dental arches in relation to the patient's mouth after which the models with the bite rims in their correct position are mounted in an articulator so that artificial teeth may be set in position on the bite rims. After the set-up of teeth on the bite rims have been accepted by try-in in the patient's mouth, the set-up of teeth is waxed to the models in the articulator and a denture base wax-up made. A plaster mold is then made from the waxed-up model in accordance with well known procedures and filled with a denture base material which is then cured within the mold. The denture base material must then be finished and polished on all external surfaces which come in contact with the tongue, cheeks and lips of the patient. Reference can be made to U.S. Pat. Nos. 2,165,597; 2,596,941; 2,685,133 and 3,460,252.

The foregoing denture fabricating procedures require three or four visits of the patient to the dentist and an equal number of separate operations in the dental laboratory before the dentures are completed. In addition to the amount of time spent by the patient, the dentist and the dental technician, errors arise because the impression material, plaster or stone, wax and base material have different coefficients of expansion. Also, errors are introduced because of discrepancies between the dimensional characteristics of the patient's tempro-mandibular joint and the mechanical articulator. It is therefore an important object of the present invention to both avoid the inaccuracies and errors inherent in the manufacture of dentures pursuant to prior art procedures as well as to significantly reduce the time involved.

In accordance with the present invention, a special moldable wax tray made in standard sizes is selected for a patient and molded by the muscles of the patient within the mouth and softened by body temperature so as to substantially conform to the gums. The molded wax tray approximately conforms to the base of the finished denture and may temporarily hold the synthetic teeth in adjusted positions within the patient's mouth. The base material in a plastic state is inserted into the tray and bonds to the anchoring portions of the teeth. Spacers supported on the internal surfaces of the tray contact the gums while the tray is being molded by the mouth, and serve to create a uniform denture thickness when molding base material. The spacers are thereafter removed and replaced by plastic base material for molding while in contact with the gums as the tray is re-inserted into the patient's mouth. After the base material is cured within the wax tray, the tray may be removed therefrom exposing a finished and more natural external surface with little or no polishing. Thus, the denture fabricating procedure of the present invention eliminates impressions, bite-blocks, try-ins and articulators. Also, polishing and general finishing of the outer base material surfaces are eliminated in favor of a more natural surface finish and appearance established by contact of the base material with the mouth molded tray. Further, the denture fabricating procedure requires only a single appointment of the patient with the dentist.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION

Figure 1:
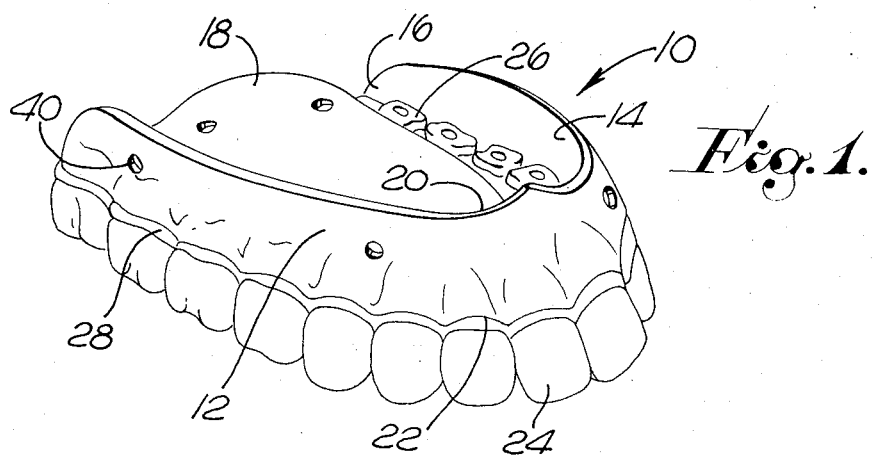
FIG. 1 is a perspective view of a moldable wax tray utilized in accordance with the present invention showing the synthetic teeth inserted therein.

Referring now to the drawings in detail, and initially to FIG. 1, a typical tray is shown generally referred to by reference numeral 10. This tray is made of a heat softened material such as wax which is rigid enough so as to retain its shape under normal conditions and temperature in the mouth or in storage. Trays of this type will be made in various standard sizes such as small, medium and large in order to permit the dentist to make a selection of trays dimensionally accommodating each patient. The tray may be softened by immersion in warm water or holding it within the heating zone of a flame. When softened, the tray is inserted into the mouth of the patient so that by use of the tongue, cheeks and lips, the tray may be molded to fit the patient's denture bearing area. Thus, the tray 10 as shown in FIG. 1 includes external surfaces 12 which generally conform to the base of a finished denture and internal surfaces 14, which generally conform to the gums of the patient. The internal surfaces of the tray form an arcuate trough 16 that is adapted to fit over the gums. In making an upper denture, the tray 10 as shown in FIG. 1 will also have a palate conforming portion 18. The tray is also provided with a periphery 20 capable of being trimmed in order to accommodate the patient's mouth as will be explained hereinafter, the periphery 20 being spaced a sufficient distance from a plurality of holes 22 formed in the tray and adapted to receive therethrough synthetic teeth 24 made of porcelain, for example, as shown in FIG. 1. Thus, the anchoring portions 26 of the teeth project into the arcuate trough 16. The teeth are loosely received within the holes 22 so that they may be adjustably positioned in the desired relationship. A sticky wax 28 may be applied about the holes 22 in order to hold the teeth in position.

In an alternate construction, the wax tray 10 may be heat-cast or formed directly to the synthetic teeth set in their respective positions. This would eliminate cutting holes in the wax tray and securing the synthetic teeth in these holes with sticky wax. Using this option, the teeth still could be moved as desired by softening the wax tray around the tooth or teeth to be moved. The anchoring portions 26 of the teeth project into the arcuate trough 16.

Figure 3:
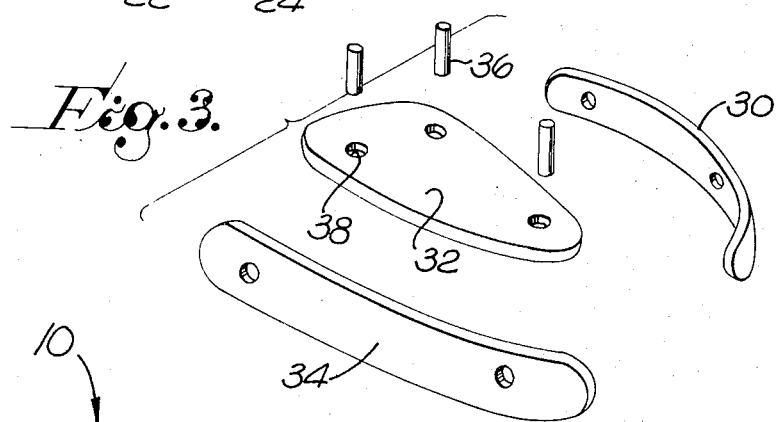
FIG. 3 is a perspective view showing the spacers associated with the assembly illustrated in FIG. 2.
Figure 2:
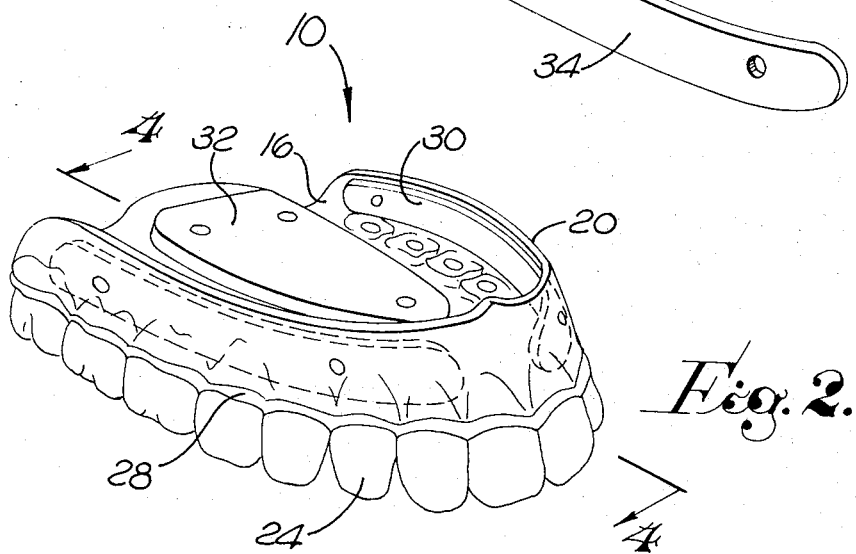
FIG. 2 is a perspective view showing the moldable wax tray illustrated in FIG. 1 with the spacers supported on its internal surfaces.

Referring now to FIGS. 2 and 3, it will be noted that a set of spacers 30, 32 and 34 made of a moldable material such as wax is provided for the tray 10 and is adapted to be supported on the internal surfaces thereof bordering the arcuate trough 16. In one embodiment of the invention, the spacers associated with the tray for making the upper denture are supported by pins 36 that project from apertures 38 in the spacers into corresponding apertures 40 formed in the tray. These supporting pins 36 may be made of the same material of which the denture base is to be made, such as methyl methacrylate. The spacers when assembled on the tray as shown in FIG. 2, will space the tray from the gums while the tray is being molded within the patient's mouth.

Figure 8:
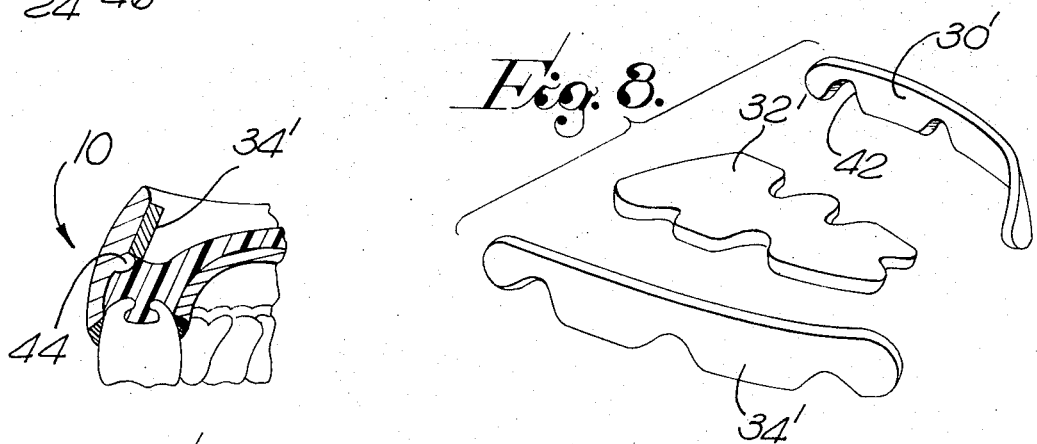
FIG. 8 is a perspective view showing alternate forms of spacers.
Figure 9:
FIG. 9 is a partial sectional view similar to a portion of FIG. 5 showing use of the alternate form of spacers illustrated in FIG. 8.

FIG. 8 illustrates another set of spacers 30', 32' and 34' which occupy the same relationship to a similar tray 10' as shown in FIG. 9 and serve the same purpose. The spacers shown in FIG. 8 however, are provided with recesses 42 along their edges. These spacers may be supported on the tray 10 by being heat sealed with wax thereto at the edges.

Figure 4:
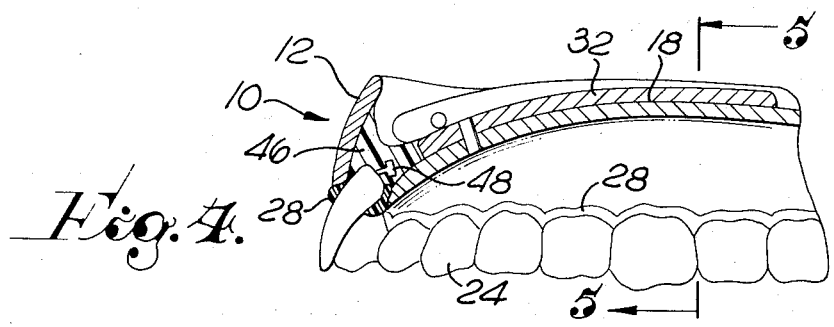
FIG. 4 is a sectional view taken substantially through a plane indicated by section line 4—4 in FIG. 2.
Figure 5:
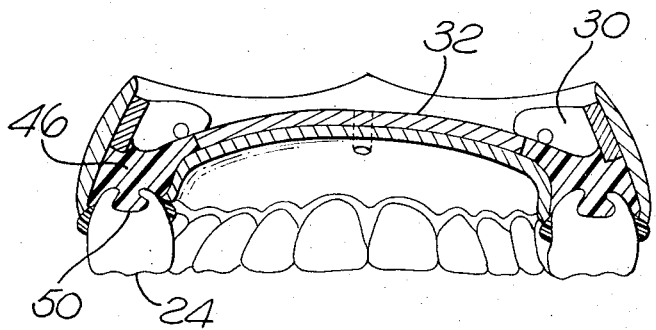
FIG. 5 is a sectional view taken substantially through a plane indicated by section line 5—5 in FIG. 4.
Figure 6:
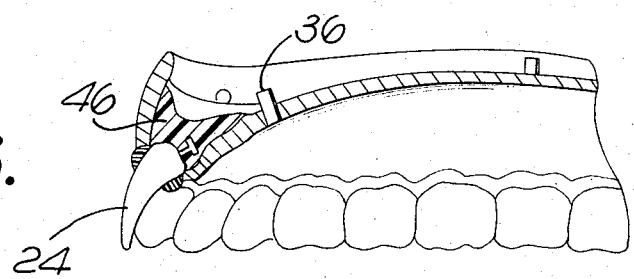
FIG. 6 is a sectional view similar to FIG. 5 but showing a subsequent stage in the denture fabricating procedure.

It will be apparent, that after a standard size of tray is selected, such as the tray 10 as shown in FIG. 1, it may be softened and inserted into the patient's mouth for molding. The teeth may be selected in accordance with desired size and color for the patient and inserted into the holes 22. Also, the spacers will be assembled on the internal surfaces of the tray in connection with the fabrication of the upper denture. In an alternate construction the wax tray secures the teeth in position by having the wax tray itself seal the teeth in place. When this tray is used the proper size tray is selected for the patient, such as large, medium or small, with the appropriate mold and shade of teeth secured in place. The wax tray is softened and inserted into the patient's mouth for molding. A quick cure polymer and monomer are then mixed and when the mixture reaches the proper consistency, a small amount 46 is poured into the arcuate trough portion 16 of the tray in order to bond to the projecting anchoring portions of the teeth 24, as shown in FIGS. 4 and 5. Only a portion of the mixture is poured into the tray before the spacers are removed sufficient to cover the pins 48 and anchoring recesses 50 on the projecting anchoring portions of the teeth. The remainder of the mixture is permitted to reach a putty-like consistency and then placed into the tray over the portion of the mixture initially inserted for bonding of the teeth in position. The tray is then inserted into the mouth of the patient who is instructed to close down until the peripheral border 20 of the wax tray touches the periphery of the denture bearing area. After it is determined that the upper anterior teeth are in the right relationship to the lip and the occlusal surface of the teeth are parallel to the alatragus line, the tray is held in position for a moment and then removed to see if an imprint of the crest of the dental ridge has been made on the base material. Additional base material mixture in its plastic state is added until this imprint is visible all around. The tray may then be removed so that the base material may set for several minutes. The spacers are then removed allowing the support pins 36 to remain as shown in FIG. 6 where spacers as shown in FIG. 3 are used. These pins will prevent the cheeks and tongue from pushing the tray against the denture bearing area when it is reinserted once again. When using spacers as shown in FIG. 8, the initial mix of base material 46 is permitted to extend into the recesses 42 which later serve as projections of base material to prevent the cheeks and tongue from pushing the tray against the denture bearing area after the spacers are removed. These spacers provide room so that a uniform thickness of base material is molded against the denture bearing area.

Figure 7:
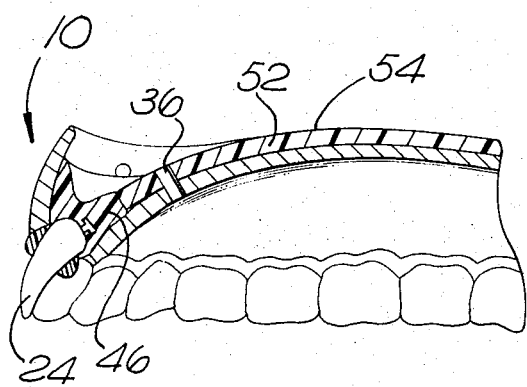
FIG. 7 is a sectional view similar to FIG. 6 but showing yet another stage in the denture fabricating procedure.

Before the tray is reinserted into the patient's mouth, another mix of base material mixture is made and permitted to gel to the proper consistency before a sufficient quantity is placed in the tray to exceed the volume previously occupied by the spacers. The tray may then be inserted into the patient's mouth and pressed into position. The previously inserted base material acts as an occlusal stop on the patient's ridge so that the correct position is obtained as the newly added plastic base material is molded against the patient's gum and palate in the case of the upper dentures, the excess material squeezing out over the wax periphery 20. After the additional material 52 as shown in FIG. 7 has been held against the ridge and palate for about two minutes, the wax tray is removed and the base material is allowed to finish curing, whereupon the wax tray is placed in boiling water to remove the wax. Thus, a gum and palate bearing surface 54 is directly formed on the base material by molding within the patient's mouth.

The finished upper denture may then be replaced within the patient's mouth and a similar procedure followed to form the lower denture. In forming the lower denture, the use of spacers may be omitted. After the same fabrication stage for the lower denture is completed, the lower denture wax tray is allowed to finish curing and then is placed in boiling water to remove the wax. When the tray material has been removed, it exposes the external surfaces of the base material or acrylic adapted to be contacted by the tongue, cheeks and lips. These external surfaces do not require any polishing or finishing since they acquire the more natural look of gum tissue from the moldable tray within which the base material was molded. Only excess base material not contacting the denture bearing area along peripheral edges is removed by a burr or stone and these edges polished with wet pumice.

One unique feature of this invention is that the teeth in the wax tray can be made to occlude with an opposing set of natural teeth. It can also be made to occlude with an opposing arch of some natural teeth and a partial denture, or it can be made to occlude against an opposing denture. Before the base material is inserted in the wax tray, the tray is heated, inserted into the patient's mouth, and the patient is instructed to bite down, so that the teeth in the tray are moved into proper biting position against the teeth in the opposing arch. Then the procedure of filling the tray is completed, and denture processed as described above.

Another unique feature of this invention is that the wax tray with attached teeth and spacers can be utilized in the making of a partial denture directly in the mouth. Remove that part of the tray labial to the remaining natural teeth, and remove the corresponding synthetic teeth so that the natural teeth can establish normal occlusion with the opposing arch. The tray is the filled with base material, cured and finished as described in the above.

A still further unique feature of this invention is that the wax tray with attached teeth and spacers can be utilized in the making of immediate-insertion dentures directly in the mouth. Remove that part of the tray labial to the remaining natural teeth and remove the corresponding synthetic teeth so that the natural teeth can establish normal occlusion with the opposing arch. Set aside that part of the tray and the synthetic teeth which were removed from the wax tray. These will be returned to their former position on the wax tray and waxed in place after the natural teeth have been extracted. After the bleeding has stopped, following the extractions, a mix of base material is inserted in the tray covering the area of the extractions. Tray is inserted in the mouth and held in position until the base material has partially cured. The tray is then removed from the mouth, and the base material is allowed to cure. The wax tray is boiled, removing the wax. Any of the base material that protruded into the sockets will now be removed, so that a smooth surface exists. Any excess of base material along the periphery of the denture is then trimmed off, and the completed denture is inserted.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

We claim:

1. A method of fabricating at least a portion of a denture from a base material utilizing a tray made of a moldable wax material, including the steps of:
   molding the wax tray inside a person's mouth to substantially conform to the gums;
   partially filling the tray with the base material in a plastic state;
   molding the base material in the wax tray by contact with the gums within the person's mouth to form gum bearing surfaces on the base material;
   curing the base material within the tray; and
   removing the tray from the cured base material to expose externally finished surfaces;
   inserting preformed spacers having support means associated therewith within the tray for contact with the gums when molding the tray by the muscles of the mouth thereby creating uniform denture thickness when molding base material.

2. An intra-oral denture tray made of a heat softened material comprising an external surface adapted to be contacted by the tongue, cheeks and lips of a person, and an internal surface contoured to substantially conform to the gums of the person forming an arcuate trough for base material, the tray being formed with a plurality of holes adapted to receive synthetic teeth having anchoring portions projecting into the trough and a plurality of preformed spacers supported on the internal surfaces bordering the arcuate trough and support means projecting from said tray to support said spacers.

3. The denture in accordance with claim 2, wherein the support means are pins.

4. The denture in accordance with claim 2, wherein said spacers are provided with recesses along their edges.

* * * * *